United States Patent [19]

Appleby et al.

[11] 4,139,679

[45] Feb. 13, 1979

[54] RECHARGEABLE ELECTROCHEMICAL SYSTEM

[75] Inventors: Anthony J. Appleby, Sevres; Jean Jacquelin, Limours, both of France

[73] Assignee: Compagnie Generale d'Electricite, Paris, France

[21] Appl. No.: 857,838

[22] Filed: Dec. 5, 1977

[30] Foreign Application Priority Data

Dec. 3, 1976 [FR] France .................. 76 36513

[51] Int. Cl.² .................................. H01M 8/04
[52] U.S. Cl. ............................ 429/21; 429/15; 429/27
[58] Field of Search .............. 429/27, 21, 14, 15, 429/17, 51, 70, 229; 204/237, 263

[56] References Cited

U.S. PATENT DOCUMENTS

| | | | |
|---|---|---|---|
| 3,849,202 | 11/1974 | Pompon | 429/13 X |
| 3,902,918 | 9/1975 | Pompon | 429/15 |
| 4,038,458 | 7/1977 | Jacquelin | 429/15 |

*Primary Examiner*—Anthony Skapars
*Attorney, Agent, or Firm*—Sughrue, Rothwell, Mion, Zinn and Macpeak

[57] ABSTRACT

The invention relates to a rechargeable electrochemical system suitable for use in an electric vehicle. It comprises a battery comprising at least one positive electrode depolarized by air, at least one negative collector, a tank, an electrolyzer comprising at least one positive electrode and one negative electrode, an electrolyte bearing in suspension the negative active material. The electrolyte is caused to flow either between the tank and the battery or between the electrolyzer and the tank, wherein the total volume of the alkaline electrolyte, bearing in suspension a negative active material containing 250 g to 350 g per liter of equivalent zinc, lies between one and a half and three times the internal volume of the electrolyzer.

12 Claims, 6 Drawing Figures

RECHARGEABLE ELECTROCHEMICAL SYSTEM

FIELD OF THE INVENTION

The present invention relates to a rechargeable electrochemical system which can be used in the propulsion of an electric vehicle.

It concerns more particularly a compact generator-regenerator system (or electrolyser), preferred embodiments of which, in contrast with already known systems, have small bulk and high power per unit weight.

SUMMARY OF THE INVENTION

The invention provides a rechargeable electrochemical system comprising a battery including at least one air depolarized positive electrode, and at least one negative collector.

A tank is provided and an electrolyser including at least one positive electrode and one negative electrode.

An alkaline electrolyte having a suspension of negative active material containing 250 g to 350 g per liter of zinc equivalent is supplied.

Means are provided for making the electrolyte flow either between the tank and the battery or between the electrolyser and the tank.

Further the total volume of the alkaline electrolyte lies between one and a half times and three times the interior volume of the electrolyser.

Further, the interior volume of the battery is equal to or less than that of the electrolyser and the available volume of the tank lies between half and twice the interior volume of the electrolyser.

An embodiment of the invention is described by way of a purely illustrative example having no limiting character, with reference to the accompanying drawings.

DESCRIPTION OF THE PREFERRED EMBODIMENT

Figure 1A:
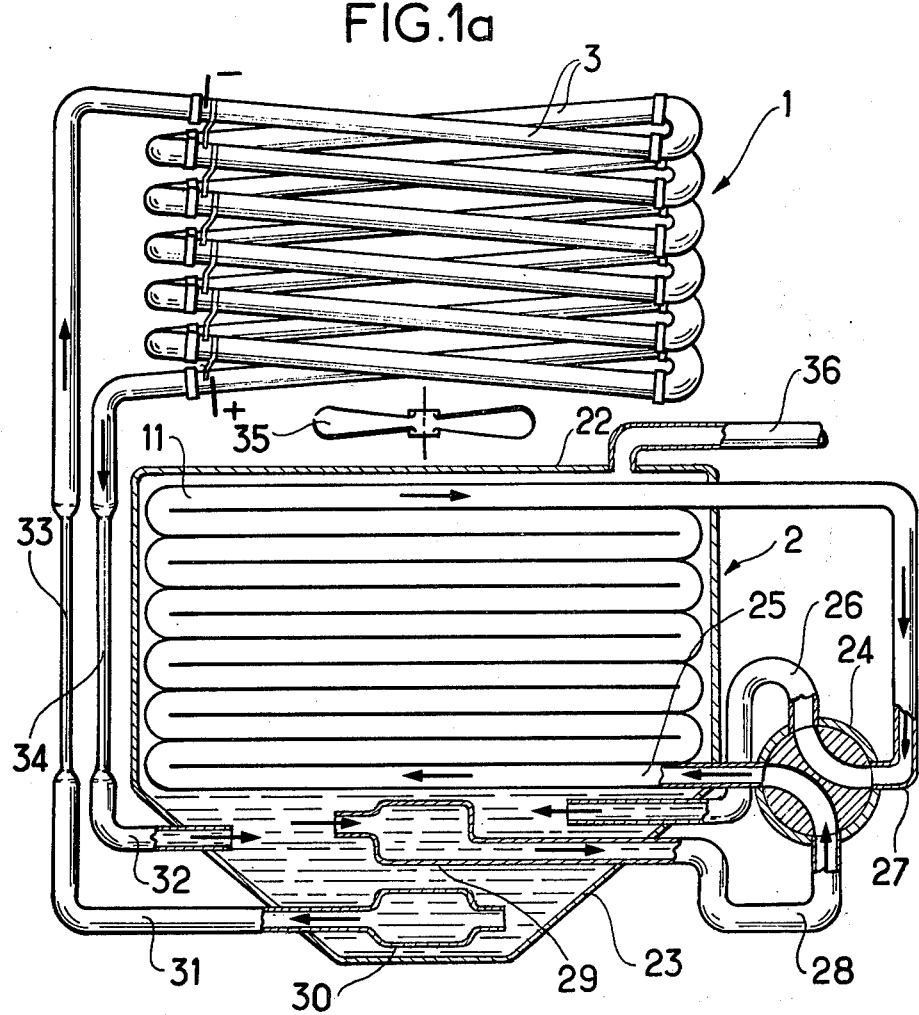
FIGS. 1a and 1b are an elevation view of a rechargeable electrochemical system and a portion thereof, respectively, in accordance with the invention.

With reference to FIG. 1a, a rechargeable electrochemical system in accordance with the invention comprises mainly a battery 1 and an electrolyser 2 disposed above the level of a pan 23.

In accordance with the Applicant's U.S. Pat. No. 3,849,202 and of its continuation application No. 512,394, for an electrochemical battery of the forced flow type, this battery is formed by tubular reaction flow elements such as 3 electrically and hydraulically connected in series.

Figure 2:
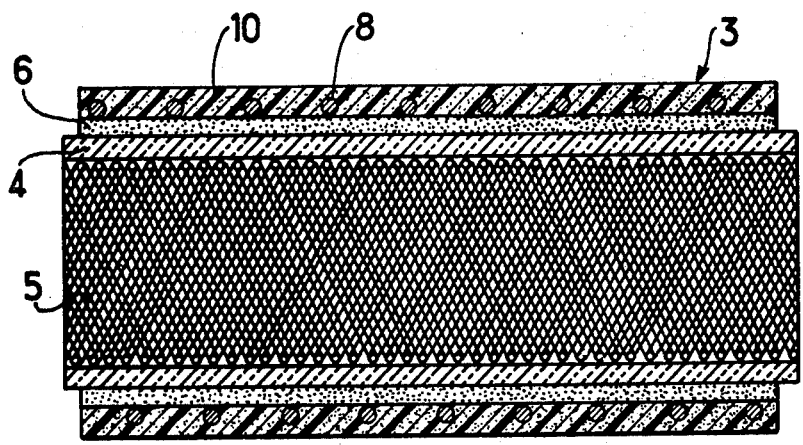
FIG. 2 is a sectional view of the structure of the battery of said electrochemical system.

With reference to FIG. 2, each tubular element comprises, from the inside towards the outside, a non-corrosive metal negative collector constituted by a grid 5 made of nickel or stainless steel for example, connected to the negative terminal of the battery. It allows the electrolyte which flows inside to reach easily a separator 4 which can be made of ceramics, asbestos or a plastics material and which is porous, insulative and hydrophilous, i.e. it facilitates the penetration of the electrolyte. An active layer 6 whose function is to allow within it the reduction reactions of the oxygen of the air is disposed against the outside face of the separator 4.

The reference 8 designates a grid made of nickel or steel for example, applied on the outside face of the active layer 6 and connected to the positive terminal of the battery. This positive collector 8 and the active layer 6 are coated in a porous and non-corrosive water-repellent layer 10. The function of this layer 10 is to prevent the solution from diffusing towards the outside of the tubular reaction element, while allowing the air to reach the active layer 6. This outside layer is constituted in particular by porous polytetrafluorethylene.

On referring to FIG. 1a, it is seen that the tubular reaction elements 3 are inclined in order to facilitate draining, as described the the Applicants in their U.S. Pat. No. 4,038,458 patented 26th July, 1977, for an air-zinc electrochemical cell.

Now, concerning said electrolyser 2, this unit is made of tubular elements 11 connected in series. Such a unit has also been described in their application Ser. No. 707,732 filed July 21st, 1976, for a method and device for regenerating zinc.

Figure 3:
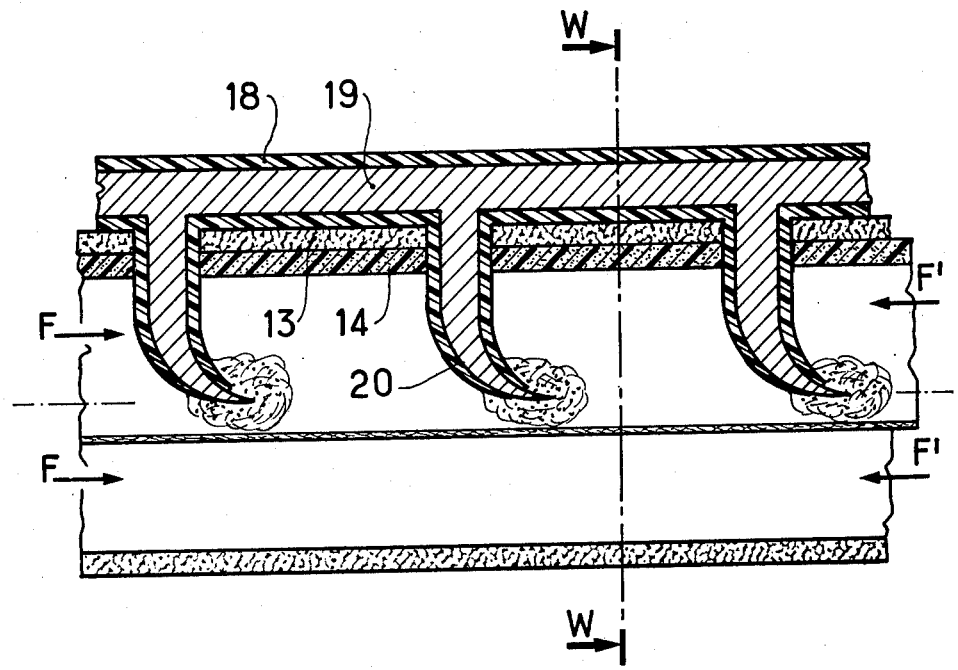
FIGS. 3 and 4 are longitudinal and transverse sectional views, respectively, of a structure of the electrolyser of said electrochemical system.
Figure 4:
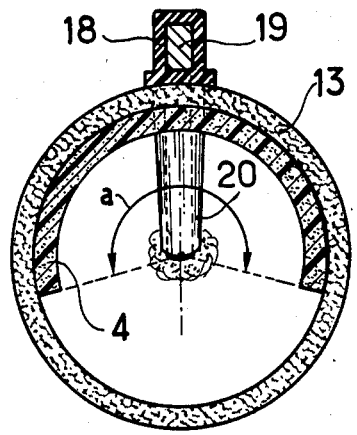

It is stated again here by way of illustration that in one embodiment, such an electrolyser or regenerator comprises, according to FIGS. 3 and 4, from the inside towards the outside, a negative electrode, an electrode formed by protrusions 20 disposed in the centre of a sealed and insulative tubular duct 13 on a part of which is disposed a positive electrode 14, delimited by a centre angle a of at least 180°.

The electrolyte which is a zincate solution in potassium hydroxide (as well as regenerated zinc) flows in this duct, as shown by the arrows F and F'.

Said protrusions 20 are cylindrical and made of a metal, more particularly magnesium and they end in points disposed in the axis of the duct and are covered, except for the point, with an insulative layer 18. Such points are connected to a base 19 also insulated and disposed on the outside of the tube, consequently on the duct 13.

The protrusions 20 need not end in a tapered point, their ends can be plane or substantially plane as described by the Applicants in their said application Ser. No. 707,732.

When a DC voltage is applied to the terminals of the electrodes 19 and 14, the alkaline zincate solution is electrolysed so that the zinc is deposited in the form of dendritic particles on the protrusions 20, whereas the oxygen which is evolved at the electrode 14 is drawn off by the flow of solution.

During the deposit or electrolysis period, the flow of the electrolyte is directed towards the protrusions in the direction of the arrows F' at a speed of 0.1 to 0.5 m.s$^{-1}$ approximately.

Then the electrodes 14 and 19 are short-circuited while directing the flow of electrolyte in the opposite direction, hence in the direction of the arrows F and at a speed greater than 1 m.s$^{-1}$ in order to detach the zinc dendrites from said protrusions 20.

Such a sequence is of course begun again periodically. Such a method has also been described by the Applicants.

On referring again to FIG. 1a, it is seen that the electrolyser 2 is contained in a chamber 22 whose bottom 23 constitutes the pan. The volume of the enclosure 22 not occupied by the electrolyser 2 therefore constitutes an electrolyte tank as will be explained hereinbelow.

The reference 24 designates a valve into which lead four tubes, a first tube 27 communicating with the upper tube of the electrolyser 2, a second tube 26 communicating with said tank, a third tube 25 communicating with the lower tube of the electrolyser 2 and lastly a fourth tube 28 communicating with a pump 29.

Further, a pump 30 supplies the upper tubular element of the battery 1, via a tube 31, while a tube 32 conveys the electrolyte leading from the lower tubular element of said battery towards the tank. Electrolytic resistors 33 and 34 are inserted in the tubes 31 and 32 and are suitable for raising and lowering the potential of the electrolyte conveyed to and coming from the battery 1 respectively.

Such resistors have also been described by the Applicants in their application Ser. No. 743,256 filed Nov. 19th, 1976, for an elecrolytic resistor.

Reference 35 designates a fan supplying the battery with air, while 36 designates a tube allowing a small reduction in pressure to be maintained in the tank.

As far as concerns the electrolyte used in the system, it is constituted in the charged state by a solution of 9 to 13 N potassium hydroxide containing in suspension the active material which is constituted by zinc powder in a concentration of 250 to 350 g/liter. Silica in a concentration of 10 to 20 g/liter is added to the electrolyte.

Further, taking into account the concentration of the zinc powder electrolyte, the constraint of avoiding any unpriming of the pumps and considerations of maximum efficiency, the Applicants have determined that the following conditions should be fulfilled:

1. The total volume of electrolyte must lie between one and a half times to three times the interior volume of the electrolyser 2.

2. The interior volume of the battery 1 must be equal to or less than that of the electrolyser 2.

3. The volume of the tank must lie between half and twice the interior volume of the electrolyser 2.

Such an electrochemical system operates as follows:

During the recharge period, the valve 2 being in the position shown in FIG. 1a, it will be seen that the pump 29 conveys the electrolyte from the tank towards the electrolyser 2 through the tubes 28 and 25.

The zinc is deposited therefore on the protrusions 20 (FIG. 3) and the residual solution is recycled through the tank by means of the tubes 27 and 26.

Figure 1B:
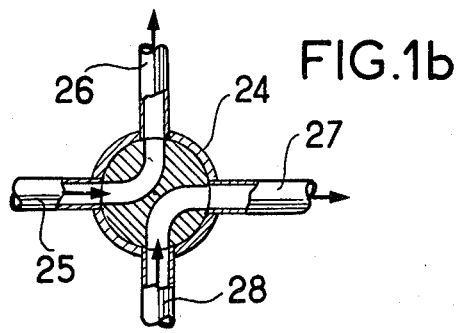

Periodically and during a few minutes, the valve 24 passes into the position indicated in FIG. 1b and it is seen that the pump 29 then conveys the electrolyte from the tank towards the electrolyser 2 through the tubes 28 and 27, but in the opposite direction to the previous one, so as to remove the zinc dendrites from the protrusions 20. The electrolyte is returned to the tank through the tubes 25 and 26 and the zinc powder is then deposited on the bottom 23 of the tank.

Of course, during the discharge period the pump 30 supplies the battery 1 with electrolyte via the tube 31, the electrolyte being returned to the tank via the tube 32.

It will be further observed that when the system stops, the zinc powder is decanted onto the pan 23.

At the beginning of discharge, this powder is taken up by the pump 30 situated at the bottom of the pan. In contrast, during recharge, the super-adjacent pump 29 sends towards the electrolyser 2 only liquid containing zincate in solution and very little powder.

Figure 5:
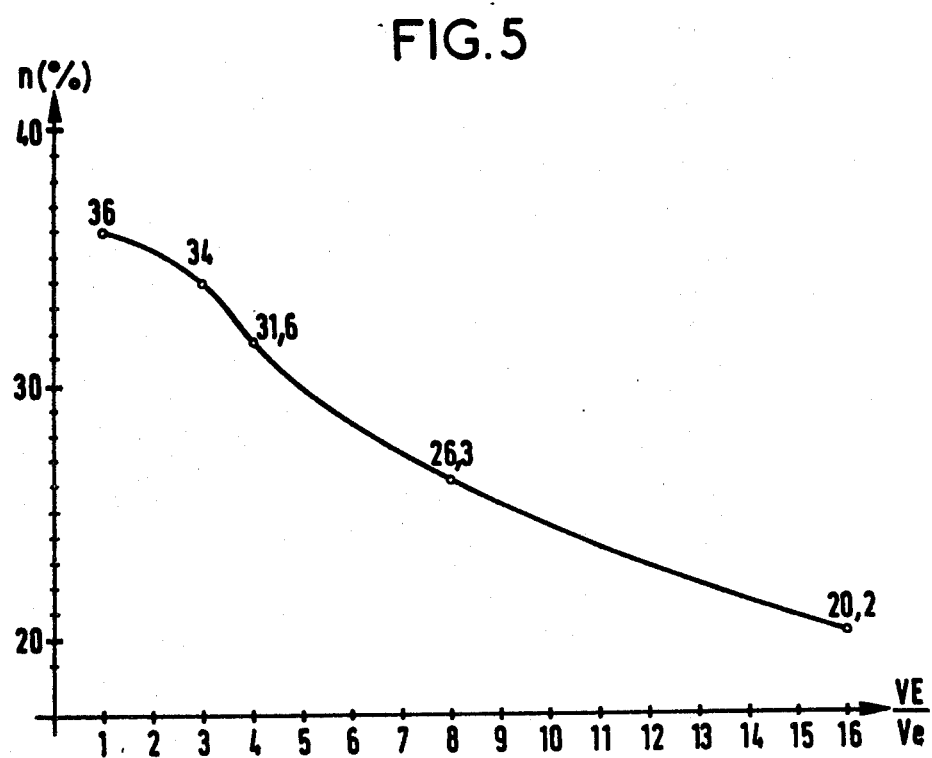
FIG. 5 is a plot showing the efficiency of said electrochemical system as a function of some of its parameters.

FIG. 5 shows the variation of the efficiency of the system as a function of the ratio $(VE_t/Ve)$ VE being the volume of electrolyte and Ve being the volume of the electrolyser.

The curve shows clearly that the efficiency is substantially inversely proportional to said ratio and that for ratios of 1.5 to 3, values of the efficiency of the order of 34 to 36% are easily reached.

The invention may be used in electric vehicles. It must be understood that the invention is in no way limited to the embodiment described and illustrated which has been given only by way of an example.

What is claimed is:

1. Rechargeable electrochemical system comprising:
   a battery including at least one air depolarized positive electrode, and at least one negative collector;
   a tank;
   an electrolyser including at least one positive electrode and one negative electrode;
   an alkaline electrolyte having a suspension of negative active material containing 250 g to 350 g per liter of zinc equivalent; and
   means for making the electrolyte flow either between the tank and the battery or between the electrolyser and the tank; and wherein
   the total volume of the alkaline electrolyte lies between one and a half times and three times the interior volume of the electrolyser.

2. Electrochemical system according to claim 1, wherein the interior volume of the battery is no greater than that of the electrolyser and the available volume of the tank lies between half and twice the interior volumes of the electrolyser.

3. Electrochemical system according to claim 1 wherein the electrolyser is formed by a sequence of tubes connected in series and enclosed in a chamber, in which tubes the electrolyte flows, and wherein a part of the available volume of the tank being constituted by the space of the chamber outside said tubes.

4. Electrochemical system according to claim 3, wherein said electrolyser tubes form a vertical array and the system further comprises means for causing the flow of electrolyte to begin from the top tube of said array.

5. Electrochemical system according to claim 4, comprising electrolytic resistors disposed in the path of the electrolyte flow between the tank and the battery.

6. Electrochemical system according to claim 5, wherein each tube of said battery comprises a concentric array of a negative collector grid, a porous separator, a porous active catalytic layer and a positive collector grid, in that order, going radially from the inside towards the outside of said array.

7. Electrochemical system according to claim 6, wherein each tube of said electrolyser comprises a concentric array of a sealed insulating tube, a positive electrode evolving oxygen and a plurality of negative electrodes connected in parallel in that order going radially from the outside of the array towards the inside; each of the negative electrodes being constituted by an insulated metal conductor ending in a bared end of small area, said ends being disposed in the electrolytic flow, the bared ends of the electrodes being directed substantially towards one end of the tube.

8. Electrochemical system according to claim 7, wherein the flow of electrolyte is directed towards the bared ends of the negative electrodes during the periods of electrolysis.

9. Electrochemical system according to claim 8, wherein the flow of electrolyte lies between 0.1 and 0.5 m.s$^{-1}$ during the periods of electrolysis.

10. Electrochemical system according to claim 9, wherein the flow of electrolyte is directed substantially in the same direction as the bared ends of the negative electrodes during the short-circuit periods for detaching the zinc dendrites previously deposited during the electrolysis periods.

11. Electrochemical system according to claim 10, wherein the flow of electrolyte is greater than 1 m.s$^{-1}$ during the short-circuit periods.

12. Electrochemical system according to claim 1 wherein the electrolyte is at a concentration lying between 9 N and 13 N of potassium hydroxide in the charged state and contains between 10 g and 20 g of soluble silica per liter.